United States Patent Office

PTO - BOYERS, PA Duty Station

MISSING PAGE TEMPORARY NOTICE

PATENT # 2559X FOR ISSUE DATE 3-19-1816

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

Drawing Pg.

Data Conversion Operation

Boyers, Pa

2559X

The United States of America,

TO ALL TO WHOM THESE Letters Patent SHALL COME:

Whereas Jacob Fuller a Citizen of the United States hath alleged that he has invented a new and useful improvement in the Machine for shelling Indian Corn

*Which improvement he states has not been known or used before his application; hath* made oath *that he does verily believe that he is the true inventor or discoverer of the said improvement; hath paid into the treasury of the United States the sum of thirty dollars, delivered a receipt for the same, and presented a petition to the Secretary of State, signifying a desire of obtaining an exclusive property in the said improvement, and praying that a patent may be granted for that purpose:* These are therefore *to grant, according to law, to the said* Jacob Fuller *his heirs, administrators or assigns, for the term of fourteen years, from the* nineteenth *day of* March *one thousand eight hundred and* sixteen *the full and exclusive right and liberty of making, constructing, using, and vending to others to be used, the said improvement; a description whereof is given in the words of the said* Jacob Fuller *himself, in the schedule hereto annexed, and is made a part of these presents.*

In Testimony whereof, *I have caused these Letters to be made Patent, and the Seal of the United States to be hereunto affixed.*

*GIVEN under my hand, at the City of Washington, this* nineteenth *day of* March *in the year of our Lord One Thousand Eight Hundred and* sixteen *and of the Independence of the United States of America, the* fortieth.

James Madison

*BY THE PRESIDENT.*

Jas Monroe *Secretary of State.*

*City of Washington,* To Wit:

I DO HEREBY CERTIFY, That the foregoing Letters Patent were delivered to me on the nineteenth day of March in the year of our Lord, One Thousand Eight Hundred and sixteen to be examined; that I have examined the same, and find them conformable to law: and I do hereby return the same to the SECRETARY OF STATE, within fifteen days from the date aforesaid, *to wit;* on this nineteenth day of March in the year aforesaid.

Richard Rush *Attorney General of the United States*

2559X

The Schdule referred to in these Letters patent and making part of the same containing a description in the words of the said Jacob Fuller himself of his Machine for shelling indian Corn This Machine consists of a principal Cylinder the axis of which rests on the horizontal beams, of the frame which supports the various parts of the Machine its surface is covered entirely with small plates of cast iron or hard wood with spikes in it/ fastened acrofs wise on the Cylinder that is in the direction of the axis from these iron plates project a number of protuberances, which when the Machine is in motion opperate on the corn in such a manner as to separate the grain from the Cob the lower part of the Cylinder is incircled by a number of Staves or leaves attached to one another by hinges placed at the extremities of the leaves they form a semicircle round the lower convex of the Cylinder and are placed about an inch and a half distant from it. The concave of this semicircle is studdied with iron spikes similar to those on the surface of the Cylinder; and every respective leaf which constitutes a part of it rests upon a spring those springs when the semicircle is prefsed on by the compafsing between it & the Cylinder yield in proportion of the prefsure and make room for the corn to prafs through A small spur wheel is attached to one end of the axis of the Cylinder and is operated on by a larger one fixed at the extremity of the frame which when turned communicates motion to the whole machine. The ears of Corn are received at the upper end of the Cemicircle which surrounds the lower part of the Cylinder & passing downwards between that and the Cylinder the grain is separated from the Cob by the Cooperating spikes with which the surface of the Cylinder, and concave of the semicircle are Studded. The grains falls through an appertuire made in the lower part of the Semicircle and grated with small iron bars and the cobs are discharged separately at the lower extremity of the semicircle. The Machine is supplied by a hopper placed at the upper extremity of the semicircle, A small fan is placed near the appertuire through which the grain falls when separated from the Cob this fan is turned when the Machine is in operation and cleanses the grain from any dust that may be connected with it Witnefses M. Caruthers
David Hutchesen Jacob Fuller